United States Patent [19]

Kraus

[11] 4,310,270
[45] Jan. 12, 1982

[54] FEED UNIT

[75] Inventor: Siegfried Kraus, Wendlingen, Fed. Rep. of Germany

[73] Assignee: The Cross Company, Fraser, Mich.

[21] Appl. No.: 119,766

[22] Filed: Feb. 8, 1980

[51] Int. Cl.³ .......................... B23B 47/00; B23B 3/36
[52] U.S. Cl. ........................................ 408/234; 82/32
[58] Field of Search .................. 408/234, 237, 241 R, 408/241 G; 82/32

[56] References Cited

U.S. PATENT DOCUMENTS

| | | | |
|---|---|---|---|
| Re. 26,393 | 5/1968 | Daugherty | 408/234 |
| 3,090,284 | 5/1963 | Dunning | 82/32 |
| 3,199,386 | 8/1965 | Deflandre | 82/32 |
| 3,680,438 | 8/1972 | Good et al. | 408/234 |
| 3,752,596 | 8/1973 | Weyand et al. | 408/234 |

FOREIGN PATENT DOCUMENTS 1235662 6/1971 United Kingdom .
1248069 9/1971 United Kingdom .

*Primary Examiner*—Harrison L. Hinson
*Attorney, Agent, or Firm*—Harness, Dickey & Pierce

[57] ABSTRACT

A tool-head supporting structure having a hollow saddle reciprocally mounted on parallel ways surmounting a bed which is provided with a top portion that structurally directly interconnects the ways and provides a flat surface on which metal chips and the like created by the machining operation can collect ahead of the saddle. The forward feed motion of the saddle is limited by a fixed stop which is mounted on the bed beneath the saddle where, for all practical purposes, it is tamper free. Access is had to the stop for servicing or replacement when necessary through an opening in the front of the saddle, and the access opening normally is closed by a removable plate on which is mounted a wiper that pushes chips ahead of the saddle into a suitable chip trough and disposal system, whereby to prevent the chips from inadvertently lodging and accumulating around the stop and interfering with proper forward positioning of the saddle which in most if not all instances must be precise.

16 Claims, 5 Drawing Figures

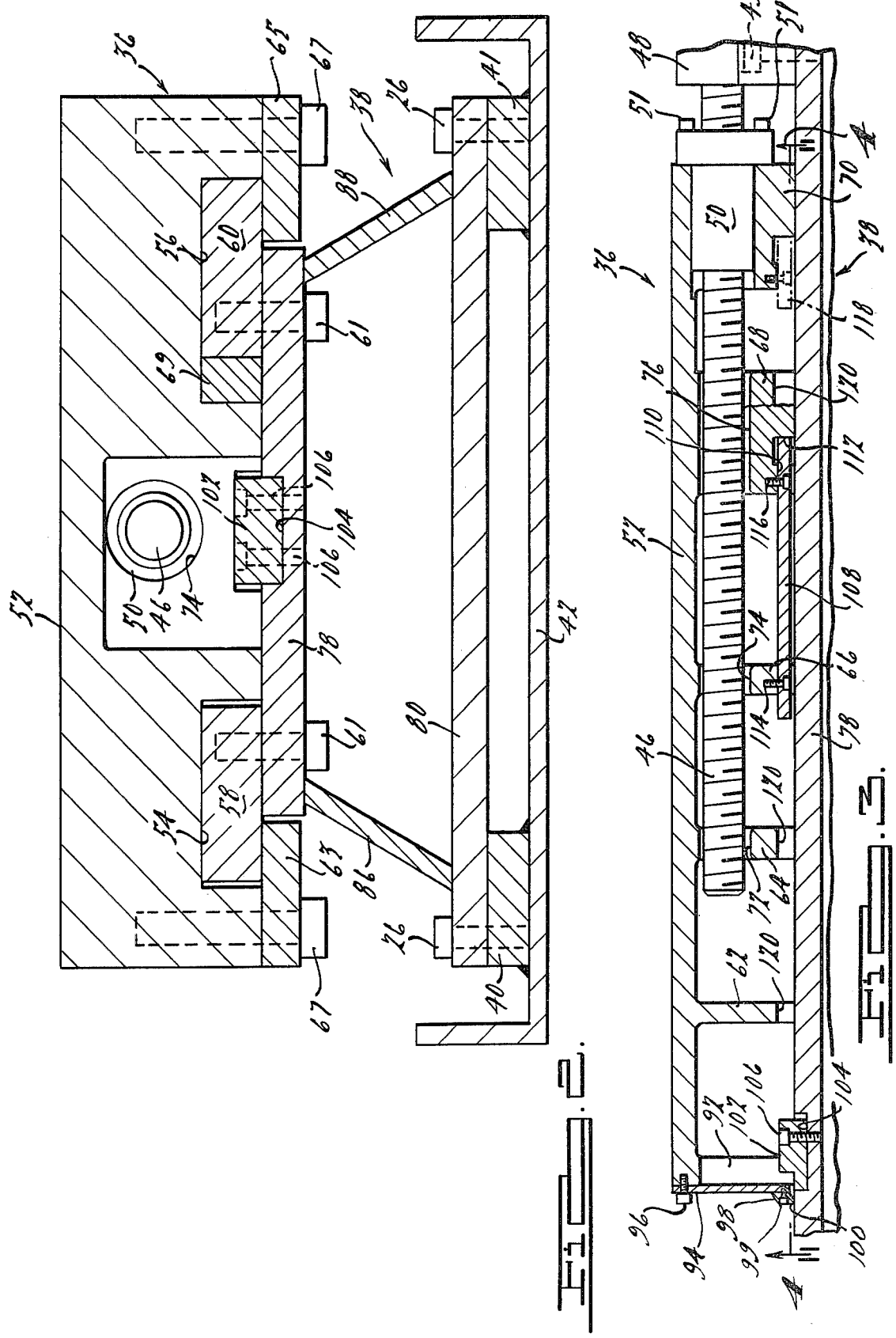

FEED UNIT

BACKGROUND OF THE INVENTION

The tool-head supporting structure of this invention is primarily adapted and pre-eminently suited for use with machine tools such as transfer machines and the like. In these types of machine tools, the conventional practice is to mount the tool heads that come in usually from one or both sides of each work station to perform a machining operation such as drilling, tapping or chamfering, for example, on work in the station. The tool head is carried by a saddle that is mounted for reciprocation on raised parallel ways surmounting a bed or base disposed alongside the station. Many machining operations require that the feed motion of the tool head be limited precisely and the usual practice is to provide a fixed stop on the bed or base against which the saddle or a movable stop carried thereby butts at the extreme forward limit of its travel. Retraction of the saddle on the ways to move the cutting tools away from the work usually is controlled by a limit switch in the control circuit of the machine.

Manifestly, a considerable amount of foreign matter, such as chips, metal shavings, and the like, is created in each work station by the machining operation performed therein. A certain amount of this scrap material invariably falls on the bed and ways ahead of the saddle, and sometimes it lodges between the fixed and movable stops and prevents the saddle from advancing as far as it is intended to go and therefore prevents the intended machining operation from being performed properly. For example, if the tool head is drilling a blind hole that must be cut precisely to a predetermined depth, a chip or shaving lodged behind the fixed stop will prevent the saddle from contacting the stop with the result that the hole is not drilled to the desired depth. As a consequence, the workpiece is defective and may have to be scrapped; or worse yet, it may cause serious damage to the tools or tool carrying and actuating mechanisms in one or more subsequent work station of the machine.

Most machines of the type with which the present invention is adapted to be used are equipped with chip disposal systems, and efforts have been made to prevent random chips and shavings accumulating ahead of the saddle from interfering with the reciprocatory motion of the latter or with the machining operation. However, considerable difficulty has been experienced in clearing away this material due in considerable degree to the form of the base and way structure that supports the saddle. The saddle conventionally is reciprocally actuated by a motor-driven feed screw that extends through a running nut on the saddle. The feed screw and its drive motor are mounted on the base with the screw below the saddle between and parallel to the ways on which the saddle travels. This arrangement has required that the ways stand relatively high off the base in order to accommodate the feed screw and related mechanism and this in turn created a relatively deep, open topped channel between the ways in which chips tended to collect and from which the chips were difficult to remove. A typical prior art structure of this type is shown in FIG. 2 of the Van den Kieboom U.S. Pat. No. 3,213,711 dated Oct. 26, 1965 and assigned to the assignee of the present invention. This prior construction made it difficult to keep the drive components and the stops as well as the ways free of chips and other foreign matter that sometimes interfere with easy operation and precise positioning of the saddle and the cutting tools carried thereby. Also, the position of the feed screw between the ways and substantially below the saddle has on occasion placed excessive strain on the working parts due primarily to the relatively great spacing between the screw and the spindle-driven cutting tools. Further, when the nature of the machining operation is such that relatively heavy loads are imposed on the saddle and its actuating mechanism, the forces thus created have sometimes tended to spread the high standing ways and to warp the saddle supporting structure.

SUMMARY OF THE INVENTION

Essentially, the present invention provides and interposes a low bed structure between the saddle and the base on which it normally is mounted and the bed is uniquely constructed to provide a solid continuous tie between the ways which greatly strengthens and rigidifies the support for the saddle. More particularly, the bed minimizes deflection sometimes encountered with the high standing ways previously used and consequently spreading of the ways which sometimes resulted over a period of use as well as torsional deflection of the supporting structure resulting from load forces created during the machining operation. At the same time, the bed eliminates the open pit which was present between the ways in which chips and other foreign matter accumulated when the saddle supporting structure previously used was employed. Instead of an open chip pit, the bed provides a closed structure and a smooth flat surface between the ways from which the chips are easily wiped away. In addition, the unique combination and correlation of saddle and bed provided by this invention houses and completely encloses the forward portion of the feed screw that drives the saddle and the fixed and movable stops that limit the forward travel of the saddle. Importantly also it provides ready access to the fixed stop when necessary for removal or replacement thereof.

DESCRIPTION OF THE DRAWINGS

FIG. 2 is a fragmentary, vertical, transverse sectional view taken on the line 2—2 of FIG. 1;

FIG. 3 is a fragmentary, vertical, longitudinal sectional view through the saddle and a portion of the bed on which it is mounted, the view being similar to FIG. 1 but showing the saddle in the fully retracted position;

DESCRIPTION OF THE PREFERRED EMBODIMENT

Figure 1:
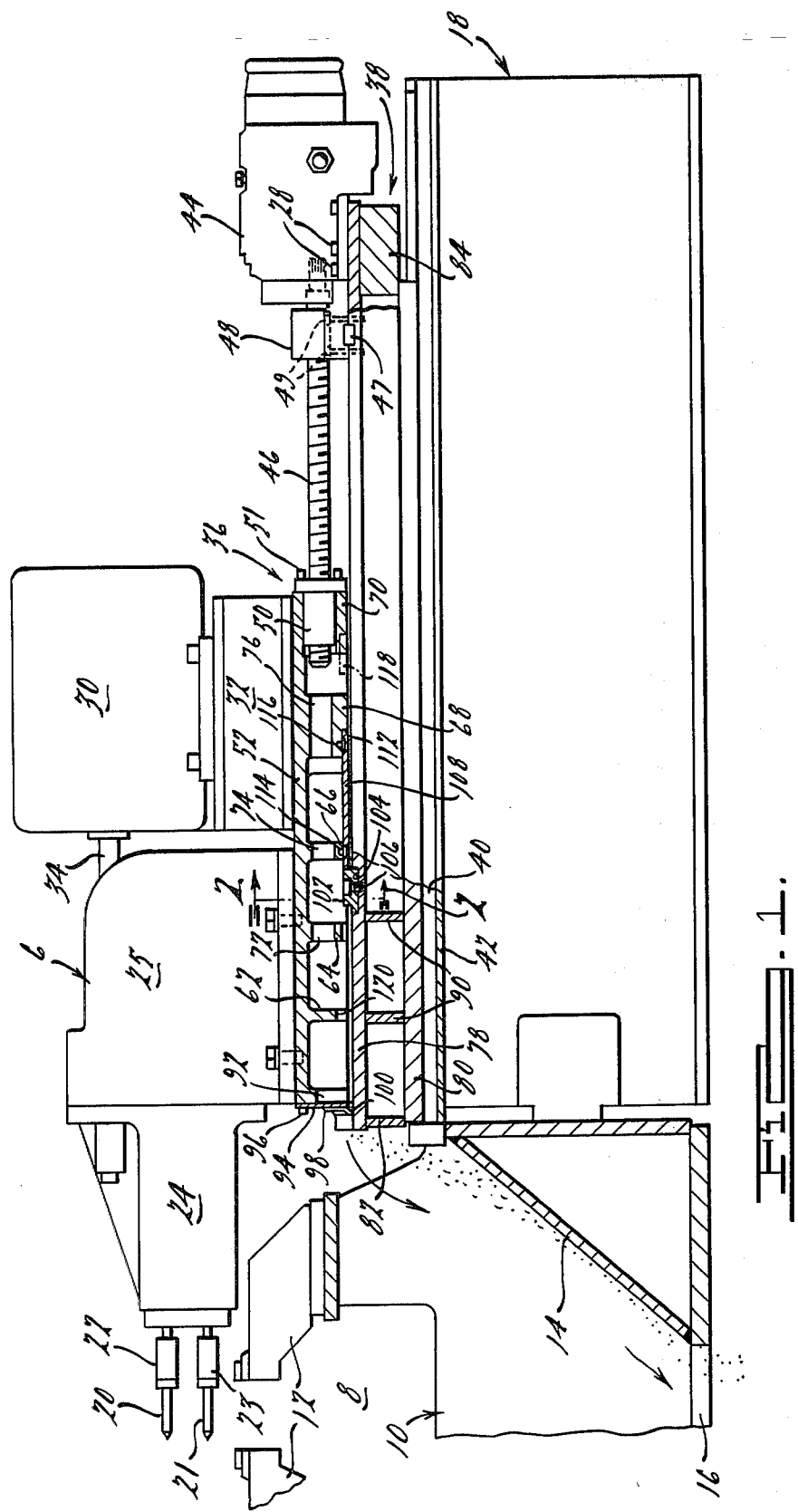
FIG. 1 is a fragmentary, vertical sectional view taken transversely through a typical transfer machine at a work station and longitudinally through a tool head and supporting structure therefor embodying the present invention disposed alongside the work station, parts thereof being shown in elevation and parts in section for clearness of illustration and particularly illustrating the saddle and the tool-head assembly at the forward limit of its transverse and feed stroke.
Figure 4:
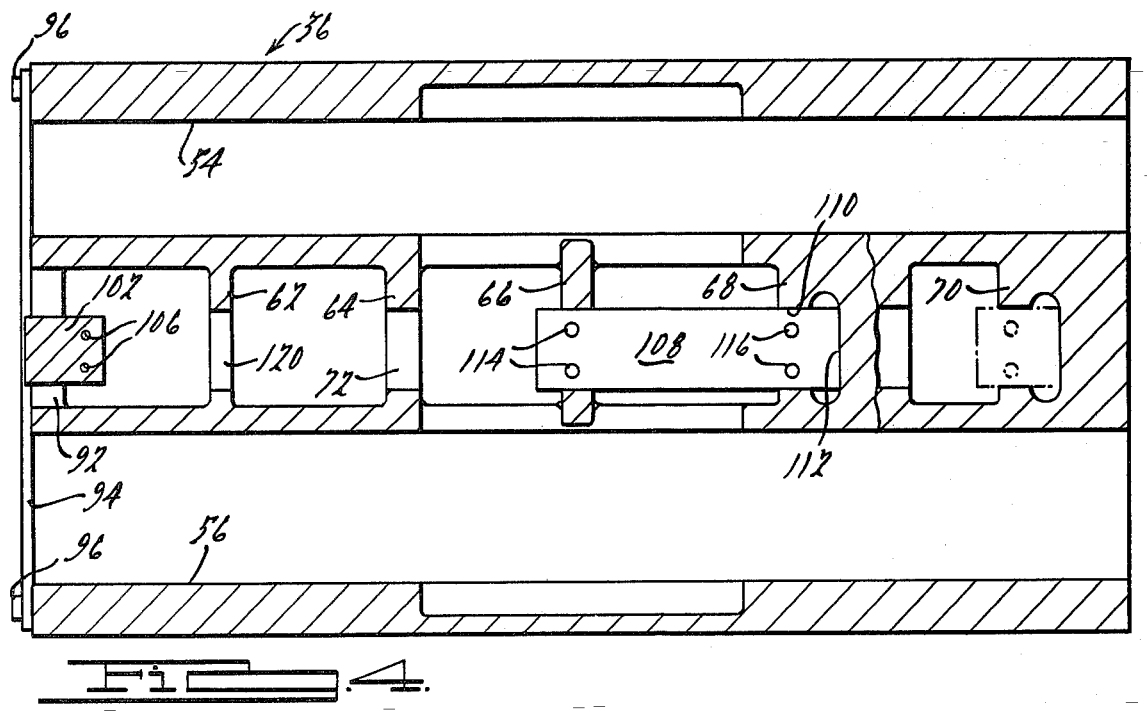
FIG. 4 is a horizontal sectional view taken on the line 4—4 of FIG. 3.
Figure 5:
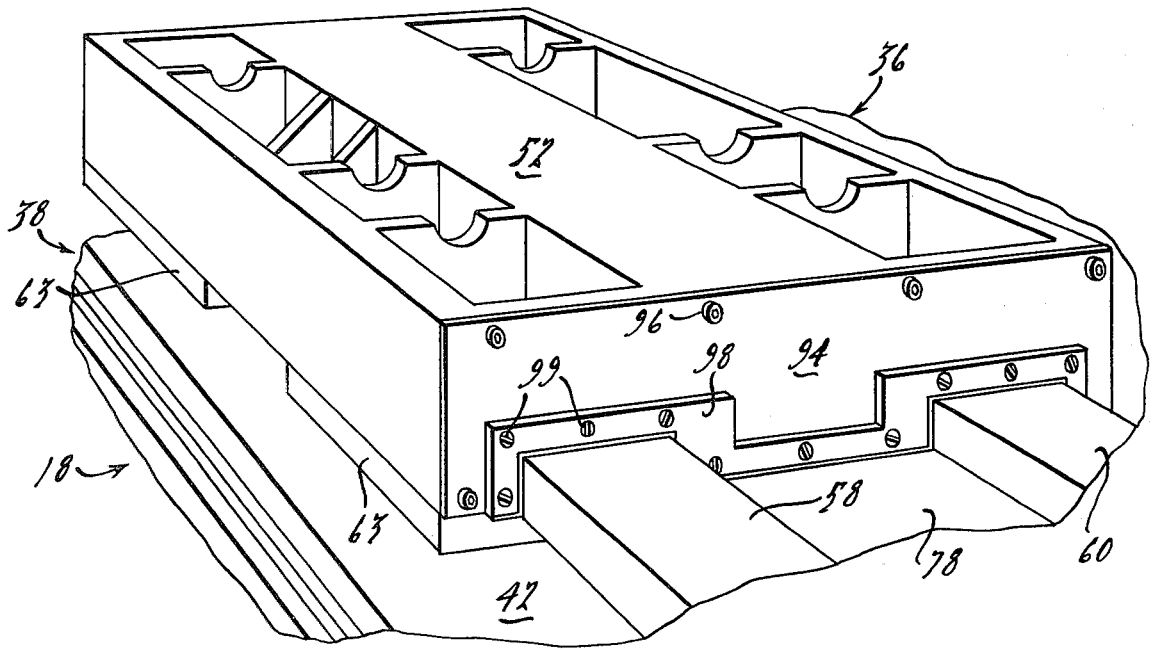
FIG. 5 is a perspective view from the front and one side of the saddle, showing the tool head removed and particularly illustrating the relationship between the saddle and its supporting bed.

As suggested, the tool-head supporting structure of this invention is adapted to be used with and as a part of machine tools such as transfer machines and the like. Transfer machines conventionally have a series of work stations, usually interspersed as required by idle stations, and workpieces either per se, or mounted on pallets are moved progressively through the machine from one station to another by a suitable transfer device. Locating and clamping means in the work stations position the workpieces precisely and hold them securely in the located position preparatory to and during machining operations performed on the work by tool heads usually mounted alongside the work station for movement to and from the workpieces. After the machining operation, the tools are withdrawn from the work areas, the workpieces are unclamped, and the transfer device is actuated to advance the workpieces simultaneously one station in the machine. FIG. 1 shows a tool-head supporting structure embodying the invention with a conventional drill head 6 mounted thereon and in operative association with a typical work station 8 in a transfer machine of a type adapted for free transfer of workpieces by a lift and carry transfer device (not shown).

More particularly, the work station 8 here shown comprises a conventional hollow center base 10 the right hand portion only of which is shown in FIG. 1. A typical work support 12 is provided in the work station 8 and the lower portion of the base below the support 12 is provided with a trough 14 into which metal chips and shavings produced in the use of the machine fall together with coolant liquid normally sprayed on the work during the cutting operation. The trough 14 directs these scrap materials and coolant to an opening 16 which leads to a suitable disposal system, not shown, with which these machines conventionally are equipped. The center base structure 10 is here shown merely by way of example to show a typical environment for the machining head supporting structure of this invention.

Mounted alongside the center base 10 and extending generally at right angles to the direction of flow of workpieces through the machine, is a side or wing base 18 on which the drill head 6 and the tool-head supporting structure of this invention is mounted. The drill head 6 here shown by way of illustration is a conventional type having a pair of drills 20 and 21 in chucks 22 and 23 attached to and rotatably driven by spindles (not shown) in a spindle housing 24. The spindles in turn are rotatably driven according to conventional practice by a gear system (not shown) in a gear housing 25. A motor 30 mounted on a motor base 32 behind the gear housing 25 is drivingly connected by a shaft 34 to the spindle driving gears in the housing 25.

The gear housing 25 and the motor base 32 surmount and are suitably fastened to a saddle 36 which in turn is mounted for reciprocation on a bed 38. The latter rests upon and is securely fastened as by bolts 26 to rails 40 and 41 welded or otherwise rigidly connected to the top plate 42 of the wing base 18. A reversible feed and traverse motor 44 on the outer end of the bed 38 and securely fastened thereto by bolts 28 is drivingly connected to a feed screw 46 which is supported for rotation at the outer end thereof by a thrust bearing 48 also mounted on and fastened to the bed by a key 47 and screws 49. Forwardly of the bearing 48 the feed screw 46 extends through and is supported by a running nut 50 which is carried by the saddle 36 and fastened thereto by screws 51. The feed screw 46 is held against longitudinal movement by the thrust bearing 48 and, as the screw turns in the running nut 50, the latter is caused to move to the right or to the left as viewed in FIG. 1, depending on the direction of rotation of the screw, and the nut 50 in turn causes the saddle 36 to advance or retract on the bed 38.

At the beginning of a machine cycle, the tool head 6 and the saddle 36 are in the retracted position shown in FIG. 3 with the drills 20 and 21 clear of the work station 8. After a workpiece has been moved into the work station and suitably located and clamped preparatory to the machining operation, the motor 44 is energized to drive the feed screw 46 in a direction to advance the saddle 36 on the bed 38. The first or traverse portion of this movement usually is made at a relatively fast rate which moves the drills 20 and 21 quickly into position for the machining operation. As the drills approach the workpiece, the rate of forward movement of the saddle 36 is slowed usually by a limit switch that controls the speed at which the drive motor 44 operates and the final or feed portion of the forward movement proceeds at the reduced rate until the saddle comes against a fixed stop usually mounted on the bed 38.

Very often the extent of forward movement of the drill head 6 must be very accurately controlled. For example, in the particular head here shown by way of illustration, if the drills 20 and 21 are required to drill a blind hole in the workpiece it may be necessary that the holes be drilled precisely to the proper depth. If the holes are required to be tapped at a later station in the machine and they are not drilled deep enough, the taps are not able to penetrate to the proper depth and the result is a wreck that may cause the destruction of the taps and perhaps also of the drive mechanism that carries the taps.

Heretofore, the stop that limits the forward motion of the saddle 36 has been mounted at the forward end of the base between ways on which the saddle travels and in such position that it is engaged by the saddle when it reaches the forward limit of its feed stroke. When so located, the fixed stop is exposed so that metal chips formed during the drilling or other machining operation sometimes fall by gravity or are carried by coolant or otherwise onto the bed 38 ahead of the saddle 36 and occasionally one or perhaps several chips lodge behind the stop and prevent the saddle from engaging the stop and thus from moving forward to its intended fully advanced position. This, in turn, results in a defective part and may possibly cause a wreck of the kind described above.

The present invention modifies the structure of the saddle and bed and the relationship each to the other so that they protect and shelter the stop at all times from metal cuttings and other particulate foreign matter that heretofore have on occasion adversely affected the operation of the tool head and, further, so that they provide a more rigid mounting for the tool head which prevents the ways on which the saddle travels from spreading after a period of time and which better resists torsional flexure and perhaps bending of the saddle supporting structure which sometimes results when the loads imposed thereon by the machining operation are excessively heavy.

More particularly, the saddle 36 comprises a cast or fabricated hollow structure having a flat, plate-like top 52 and longitudinal, parallel grooves 54 and 56 in the undersurface and adjacent to the opposite sides thereof which fit over and slidably receive longitudinal ways 58 and 60 that are fixedly secured by bolts 61 to the bed 38. As perhaps best shown in FIG. 2, the ways 58 and 60 project laterally beyond the bed top plate 78 and keepers 63 and 65 fastened by bolts 67 to the underside of the saddle 36 at the outer sides of the grooves 54 and 56 extend under the projecting portions of the ways to hold the saddle securely but slidably on the bed 38. In the particular construction and arrangement here shown by way of illustration, side clearance is provided between the groove 54 and the rail 58 and a gib 69 is fitted closely between the inner sides of the groove 56 and its way 60 to guide and control and reciprocatory movement of the saddle on the ways. The side portions of the saddle 36 in which the grooves 54 and 56 are formed are joined by a plurality of longitudinally spaced, transverse partition webs 62, 64, 66, 68 and 70 that substantially reinforce the saddle and increase its torsional rigidity. The rearmost webs 68 and 70 beneath the portion of the saddle 36 that supports the drive motor 30 are relatively thicker and therefore stronger than the forward webs 62, 64 and 66. In addition, the extra thickness of the rearmost web 70 assures adequate support for and retention of the running nut 50. Openings 72, 74 and 76 are provided in the intermediate webs 64, 66 and 68, respectively, in-line with each other and with the feed screw 46, to accommodate the latter when the saddle 36 retracts or moves rearwardly on the ways 58 and 60.

It will be observed that when the feed screw 46 moves into and retracts from the saddle 36 as the latter moves on the ways 58 and 60 between the fully advanced and fully retracted positions shown by FIGS. 1 and 3, respectively, the screw is substantially in transverse alignment with the ways so that essentially the full driving thrust of the screw is utilized for reciprocally actuating the saddle and to minimize wear due to torque effect tending to press the saddle downwardly on the ways or to lift it off the ways. Furthermore, the form and structure of the saddle positions the drive screw 46 in close proximity to the flat top plate 52 and therefore minimizes the vertical distance between the screw and the spindles that drive the cutting tools 26 and 28. As a consequence, wear and strain on the supporting structure due to torque effect resulting from the reaction forces against the drill head and transfer by the latter to the saddle 36 and bed 38 during the machining operation is minimized. Lastly, but not the least of the benefits derived by the particular saddle construction, is the fact that the portion of the feed screw 46 ahead of the running nut 50 is fully housed and protected by the saddle in all reciprocable positions of the latter whereby not only the fixed and movable stops that limit the forward motion of the saddle but also the forward portion of the feed screw are shielded from chips and other contaminants to which they otherwise would be exposed in the operation of the equipment, and so that the lubricating system that lubricates the interfaces between the feed screw 46 and the running nut 50 and between the channels 54 and 56 and ways 58 and 60 is able to perform its intended function more efficiently.

The bed 38 here shown is a fabricated structure having vertically, relatively closely spaced, flat, top and bottom plate-like members 78 and 80 held rigidly together by front and rear wall members 82 and 84, side wall members 86 and 88, and longitudinally spaced, transverse partitions 90. All of the members 78–90 forming the bed 38 are welded or otherwise fastened together in a solid rigid construction. It will be readily apparent however that, while a fabricated structure is here shown, the bed 38 may if desired be cast in the manner of the saddle 36 or it may be a combination casting and fabricated structure. It is essential that the bed 38 provide a solid inflexible support for the ways 58 and 60 and for the saddle 36 and the tool head 6 carried thereby and that the top plate 78 thereof be above the top of the chip trough 14. Further, it is important that the top plate 78 provide a solid continuous tie between the ways 58 and 60 for their entire length. Further, it is desirable not only that the top plate 78 provide a solid tying structure between the ways 58 and 60 but that it also be the upper member of a closed tubular structure as this gives the bed exceptional resistance to torque deflection. In addition, it is a special and important feature of this invention that the top plate 78 present a smooth, flat top surface between the ways 58 and 60 on which chips and other particulate foreign matter can accumulate ahead of the saddle 36 and from which such matter can be readily cleaned away.

In this latter connection, it will be observed (FIG. 1) that the front end of the saddle 36 has a central opening 92 which is normally closed by a front cover 94 and that the latter is detachably fastened to the saddle by screws 96. The lower edge of the cover 94 conforms generally to but is spaced at least slightly from the ways 58 and 60 and from the top surface of the bed 38, and a wiper 98 of any suitable flexible and resilient material such as rubber or the like is fastened to and carried by the lower marginal edge portion of the cover. The wiper 98 which closely fits and wipingly engages the ways and the top surface of the bed 38 between the ways 58 and 60 is fastened to the cover 94 by screws 99. Preferably, the lower edge of the wiper 98 that contacts the ways 58 and 60 and the top of the bed 38 is relatively thin and flexible as shown at 100 (FIGS. 1 and 3) to minimize wear and to assure a close wiping contact with the engaged surfaces at all times. Thus, any chips or other foreign matter that collects on the bed 38 in front of the saddle when the latter is retracted are gathered and pushed along the ways and the bed when the saddle 36 is advanced on its transverse and feed stroke. In the fully advanced position of the saddle 36, the wiper 98 is at or in close proximity to the feed trough 14 so that all or substantially all of the chips accumulated by the wiper 98 are pushed off the bed 38 and into the trough which then conducts them through the opening 16 to the chip disposal system which as stated previously is a conventional part of the machine.

When the cover 94 is removed, the opening 92 provides ready access to a fixed stop 102 which is set into a recess 104 provided in the top surface of the bed top plate 78 and detachably fastened in place by screws 106. As shown in the drawings, the stop 102 projects above the top plate 78 and into the path of travel of a movable stop 108 which is fastened to and carried by one or, if desired, several of the saddle partitions 62–70.

In FIGS. 1 and 3, the movable stop 108 is shown bridging and attached to the two intermediate webs 66 and 68. In any event, the movable stop 108 is disposed behind or rearwardly of the fixed stop 102 and it engages the latter when the saddle 36 and the tools carried by the drill head 6 associated therewith have moved to the forward limit of their travel. Thus, the location and length of the movable stop 108 will vary in different situations depending upon the nature of the drilling or other cutting operation being performed by the tool head 6.

Regardless of the nature of the cutting operation, however, the saddle 36 will always be moving relatively slowly on its feed stroke at the moment of impact between the fixed and movable stops 102 and 108, and it is true also that the saddle will be advancing under power when the stops come together. Consequently, it is desirable that the fixed stop 102 seat solidly against the forward edge of the recess 104 to relieve the fastening screws 106 of impact forces. It is equally desirable that at least the rear terminal portion of the movable stop 108 be fitted into a recess, such as the one shown at 110 in the saddle web 68, and that the rearward end thereof engage the forwardly facing edge 112 of the recess 110 so that the impact force is transferred directly from the stop 108 to the butted edge of the recess. The movable stop 108 is here shown attached at the forward end thereof to the web 66 by screws 114 and to the web 68 at the rearward end thereof by screws 116. Endwise engagement of the movable stop 108 with the recess shoulder 112 relieves the screws 114 and 116 of shearing stresses when the stops come together.

Manifestly, both the fixed stop 102 and the movable stop 108 are readily removable for servicing or replacement merely by removing the screws 106 and 114, 116 by which they are fastened to the bed 38 and to the saddle 36, respectively. It may be necessary occasionally to removal one or the other or perhaps both of the stops for refinishing or replacement if they become brinelled or otherwise damaged or physically altered in some way after a period of use. Also, in the operation of a transfer machine of the type here shown, it is necessary occasionally to change or modify the machining operations performed at various stations in the machine and this in turn may require a change in the length of the traverse and feed stroke of the tool head and particularly the point at which the forward travel of the saddle 36 is stopped. Replacement of the movable stop 108 of course requires that the saddle 36 be first removed from the bed 38 but this can be done relatively easily and quickly. The fact that both the fixed stop 102 and the movable stop 108 are removable and readily replaceable greatly facilitates modification of the forward feed and traverse movement to accommodate a change in the machining operation or otherwise. This is particularly easy in the case of the fixed stop 102, however, by reason of the fact that the stop is located in proximity to the front opening 92 when the saddle 36 is in the fully retracted position. Removal of the stop 102 can be readily accomplished merely by removing the front cover 94 and the screws 106 which fasten the stop to the bed 38. It will be readily apparent in this connection that the screws 106 are readily accessible through the opening 92 and that, once the screws have been removed, the stop 102 can be easily taken out for replacement through the opening 92.

On the other hand, when the cover 94 is attached as it normally is to the saddle 36, it closes the access opening 92 to keep metal chips and the like from getting under the saddle and interfering with the movement thereof. In fact, the saddle 36 and its cover 94 fully house and enclose both of the fixed and movable stops 102 and 108 during the entire reciprocatory travel of the saddle, and the wiper 98 prevents chips from gaining access to the interior of the saddle under the lower edge of the cover. Thus, it is substantially impossible for chips or any solid particulate matter generated from the machining operation from getting into a position where they can lodge against the fixed stop 102 and interfere with the feed stroke of the tool head 6 as occasionally happens when the open stop arrangement previously referred to is used.

The position of the fixed stop 102 on the bed 38 of course is determined by the point at which the saddle 36 is stopped when fully retracted since it is necessary that the fixed stop be located in proximity to the front opening 92 at this time. Thus, the position of the movable stop 108 on the saddle 36 will vary depending on the point at which the forward travel of the saddle is to be stopped. The forward limit of travel of the saddle 36 can be varied in a relatively small degree by varying the length of the movable stop 108 but, if the change in forward travel is substantial, it may be necessary to change the entire mounting location of the stop. This can be readily accomplished with the structure of this invention simply by fastening the stop 108 to one or the other of the webs 62–70.

While the movable stop 108 is here shown attached to webs 66 and 68 it could be just as well attached to one or the other of these webs or, if desired, to the rearmost web 70 as shown in phantom lines at 118. Regardless of where the movable stop is located in the saddle, it is of course necessary that all of the webs 62–70 ahead of the mounting position be recessed or cut away as at 120 to provide clearance for the fixed stop 102 as the saddle moves back and forth on the ways 58 and 60.

I claim:

1. In a machine tool, a machining head supporting structure comprising laterally spaced parallel ways;
   a reciprocable saddle advanceable and retractable on said ways and adapted to carry a tool head;
   a bed carrying said ways and supporting said saddle, said bed having top structural means attached to and extending between said ways for substantially the entire length thereof and providing a solid, continuous tie between said ways whereby to minimize deflection and spreading thereof in use;
   a center base provided with chip disposal means;
   a wing base carrying said bed and positioning the forward end of said top structural means adjacent to said chip disposal means;
   wiper means on said saddle snugly fitting said ways and the top portion of said bed operative to push chips accumulating on the latter ahead of the saddle when the latter is advanced on said ways; and
   drive means for advancing and retracting said saddle on said ways operative to position said saddle at the forward limit of its travel with said wiper means proximate to said chip disposal means.

2. The combination as set forth in claim 1
   wherein said saddle is provided with a cavity opening through the bottom thereof and extending lengthwise thereof a distance at least as great as the reciprocatory travel of said saddle, and
   including interengageable, fixed and movable stops on said bed and said saddle, respectively, both of said stops being disposed entirely within said cavity in all reciprocatory positions of said saddle whereby said saddle shields said stops from chips and the like falling on said supporting structure in use, and
   an opening in said saddle disposed to be adjacent to said fixed stop when the saddle is at one limit of its reciprocatory travel and providing access to said fixed stop for removal or replacement thereof.

3. The combination as defined by claim 2 wherein said access opening is in the front of said saddle, and including a closure plate for said access opening attached to said bed and removable therefrom to expose said opening for access to said fixed stop; and wiper means movable with said bed snugly fitting said ways and the top structural portion of said bed between and adjacent to said ways, said wiper means being operative to push chips accumulating on said bed ahead of the saddle and away from said stop means when the bed is advanced on said ways.

4. The combination as set forth in claim 3 wherein said fixed stop is positioned on said bed to be adjacent to the access opening in said saddle when the latter is at the limit of its retractive travel, wherein said wiper means is attached to said closure plate, and wherein said closure plate is removably attached to said saddle to permit removal and replacement of said fixed stop through said access opening when said saddle is retracted on said ways.

5. The combination as defined by claim 2 wherein said fixed stop is recessed into the top of said bed between said ways, and wherein said recess provides a shoulder which is integral with the bed ahead of said fixed stop against which the latter seats and which sustains impact forces occurring when the movable stop on said saddle strikes the fixed stop on said bed to limit forward travel of said saddle.

6. The combination as set forth in claim 2 wherein said saddle is provided in said cavity with a plurality of longitudinally spaced mountings for said movable stop, and wherein said movable stop is adapted to be detachably fastened to a selected mounting to define the extent of reciprocal movement of said saddle on said ways.

7. The combination as set forth in claim 6 including shoulder means integral with said bed and with said mountings, said bed shoulder means being disposed ahead of said fixed stop and engaged thereby to sustain impact forces occurring when the fixed and movable stops come together and said mounting shoulder means being disposed behind and selectively engaged by said movable stop for sustaining said impact forces.

8. The combination as set forth in claim 2 including a drive for said saddle, said drive comprising a nut carried by said saddle; and a feed screw extending horizontally through said nut and into said cavity above said stops and said ways.

9. The combination as set forth in claim 6 wherein said saddle is provided with a plurality of longitudinally spaced ribs disposed in and extending transversely of said cavity, and wherein said mountings are on respective of said ribs, and including a drive for said saddle, said drive comprising a feed screw disposed parallel to the direction of travel of said saddle and extending into the latter through the rear thereof above said ways and said stops and through clearance openings provided in said ribs;

a nut fixed to said saddle and in threaded engagement with said feed screw; and means for reversibly rotatably driving said feed screw.

10. In a machine tool, a machining head supporting structure comprising a bed;

laterally spaced parallel ways on said bed; and a saddle adapted to carry a tool head and being mounted for reciprocation on said ways, said bed having integral, rigidly interconnected, top, side and bottom portions forming a support for said ways and said saddle and being of essentially tubular configuration in transverse section for enhanced torsional rigidity, the top portion of said bed extending continuously and uninterruptedly between and for substantially the entire length of said ways.

11. The combination as defined by claim 10 wherein the top portion of said bed presents an exposed, flat, smooth, chip-collecting surface at one end of said saddle in all reciprocatory positions thereof, and including wiper means on said saddle snugly fitting said ways and the exposed chip-collecting surface of said bed top portion operative to push chips accumulating on the latter ahead of the saddle when the latter is reciprocated in one direction on said ways.

12. The combination as defined by claim 11 including means providing a chip disposal trough; and a base supporting said bed with one end of the chip-collecting surface thereof proximate to said chip trough, and wherein movement of said wiper by reciprocation of said saddle to the limit of its travel in said one direction positions the wiper substantially at the mentioned end of said chip collecting surface to push chips collected on said surface ahead of the wiper into said chip disposal trough.

13. A machining head supporting structure for a machine tool comprising a bed;

laterally spaced ways on said bed, said bed having means defining a flat, chip-collecting surface disposed between and at substantially the same level as said ways;

a saddle of hollow construction mounted for reciprocation on said ways;

a chip wiper on and fixed to said saddle wipingly engaging said ways and said chip-collecting surface and operative by movement of said saddle on said ways to push chips on said surface in one direction; and fixed and movable stops on said bed and in said saddle, respectively, said fixed stop being disposed behind said chip wiper and enclosed by said saddle in all reciprocable positions of the latter on said ways, whereby said wiper keeps chips away from said stops in use at all times.

14. The combination as defined by claim 13 wherein said saddle has a removable front end portion which normally covers an access opening for said fixed stop, said removable front end portion carrying said chip wiper, and removal of said front end portion permitting access to said fixed stop through said opening.

15. The combination as set forth in claim 13 including drive means for reciprocally moving said saddle on said ways, said drive including
    a nut carried by said saddle at the rearward end thereof; and
    a feed screw associated with said bed extending parallel to said ways through and in threaded engagement with said nut, said feed screw adapted to project into the hollow interior of said saddle in use and being above and in close proximity to said fixed and removable stops in its projected travel into said saddle.

16. The combination as defined by claim 15 including a machining head on said saddle having spindle-driven tool means disposed essentially parallel to the direction of reciprocatory travel of said saddle; and
    wherein said feed screw extends into said saddle in relatively close proximity to said chip-collecting surface whereby to minimize distance between the feed screw and said spindle-driven tool means.

* * * * *